United States Patent
Iwata et al.

(10) Patent No.: US 6,189,499 B1
(45) Date of Patent: Feb. 20, 2001

(54) BALANCING DEVICE FOR RECIPROCATING ENGINE

(75) Inventors: Kazuyuki Iwata; Tomonori Niizato, both of Saitama (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/371,786

(22) Filed: Aug. 10, 1999

(30) Foreign Application Priority Data

Aug. 12, 1998 (JP) .................................................. 10-228380

(51) Int. Cl.[7] .................................................. F16F 15/26
(52) U.S. Cl. .................................... 123/192.2; 123/196 R
(58) Field of Search .............................. 123/192.2, 196 R

(56) References Cited

U.S. PATENT DOCUMENTS

| | | | | |
|---|---|---|---|---|
| 4,440,123 | * | 4/1984 | Tsai | 123/192.2 |
| 4,703,724 | * | 11/1987 | Candea et al. | 123/196 R |
| 4,703,725 | * | 11/1987 | Weertman | 123/192.2 |
| 4,766,857 | * | 8/1988 | Laine et al. | 123/196 R |
| 5,305,656 | * | 4/1994 | Kamiya et al. | 123/192.2 |
| 5,327,859 | * | 7/1994 | Pierik et al. | 123/192.2 |
| 5,535,643 | * | 7/1996 | Garza | 123/192.2 |
| 5,743,230 | * | 4/1998 | Yamazaki et al. | 123/192.2 |
| 5,788,381 | * | 8/1998 | Yamazaki et al. | 123/192.2 |
| 5,791,309 | * | 8/1998 | Yamazaki et al. | 123/192.2 |
| 5,875,753 | * | 3/1999 | Ishikawa | 123/192.2 |
| 6,079,383 | * | 6/2000 | Shirai et al. | 123/192.2 |

* cited by examiner

*Primary Examiner*—Tony M. Argenbright
*Assistant Examiner*—Jason Benton
(74) *Attorney, Agent, or Firm*—Armstrong, Westerman, Hattori, McLeland & Naughton

(57) ABSTRACT

A balancing device for a reciprocating engine is provided which is improved so as not to disturb the compactification of an engine. There is provided a balancing device for a reciprocating engine comprising two balance shafts 10L, 10R gear connected to each other, a chain/sprocket mechanism 9, 11, 12 for coupling at least one 10L of the balance shafts with a crankshaft 1 in an interlocking fashion, a chain tensioner 14 for automatically adjusting the tension of the chain 12 and a pump receiving portion 22 integrally provided in a balance shaft holder 16 for supporting the balance shafts for receiving a rotor 21B of a lubricating oil pump 21, the balancing device being characterized in that the rotor of the lubricating oil pump is directly connected to the other balance shaft 10R, and that the chain tensioner is disposed on an shaft end side of the other balance shaft. In accordance with the balancing device constructed as described above, the chain tensioner can be displaced within a range that does not project largely from a triangular contour formed by the two balance shafts and the crankshaft.

6 Claims, 9 Drawing Sheets

//<br>
BALANCING DEVICE FOR RECIPROCATING ENGINE

BACKGROUND OF THE INVENTION

1. Field of the Invention

The present invention relates to a balancing device for a reciprocating engine.

2. Description of the Prior Art

An engine becomes known in, for instance, a Japanese Patent Unexamined Publication (Kokai) No. Hei.9-210135 which is constructed such that balance shafts each provided with counterweights for canceling a secondary vibromotive force generated by a piston are provided so as to extend below a crankshaft and that the rotation of the crankshaft is transmitted to the balance shafts via a chain/sprocket mechanism.

In a conventional engine with a balancing device like this, it is constructed such that the rotation of a crankshaft is transmitted to sprockets provided individually on a rotor of a lubricating oil pump and one of the balance shafts via a common chain.

On the other hand, in the chain/sprocket mechanism, a chain tensioner is inevitable for automatically adjusting the tension of the chain. In a construction as described above, however, in which the sprockets for the crankshaft, balance shaft and lubricating oil bump are disposed in a triangular arrangement, the chain tensioner has to be disposed to project sideward, and this hinders the engine from being compactified.

SUMMARY OF THE INVENTION

The present invention was made to solve the problem inherent in the prior art, and an object thereof is to provide a balancing device for a reciprocating engine that is improved without hindering the compactification of an engine.

In order to attain the above object, there is provided in accordance with the present invention a balancing device for a reciprocating engine comprising two balance shafts intermeshed with each other, a chain/sprocket mechanism for coupling at least one of the balance shafts with a crankshaft in an interlocking fashion, a chain tensioner for automatically adjusting the tension of the chain and a pump receiving portion integrally provided in a balance shaft holder for supporting the balance shafts for receiving a rotor (for instance, an outer or inner rotor described in an embodiment of the present invention) of a lubricating oil pump, the balancing device being characterized in that the rotor (for instance, the inner rotor described in the embodiment) of the lubricating oil pump is directly connected to the other balance shaft, and that the chain tensioner is disposed on an shaft end side of the other balance shaft. In accordance with the balancing device constructed as described above, the chain tensioner can be disposed within a range that does not project largely from a triangular contour formed by the two balance shafts and the crankshaft.

DESCRIPTION OF THE PREFERRED EMBODIMENT

Referring to the accompanying drawings, an embodiment of the present invention will be described in detail below.

Figure 1:
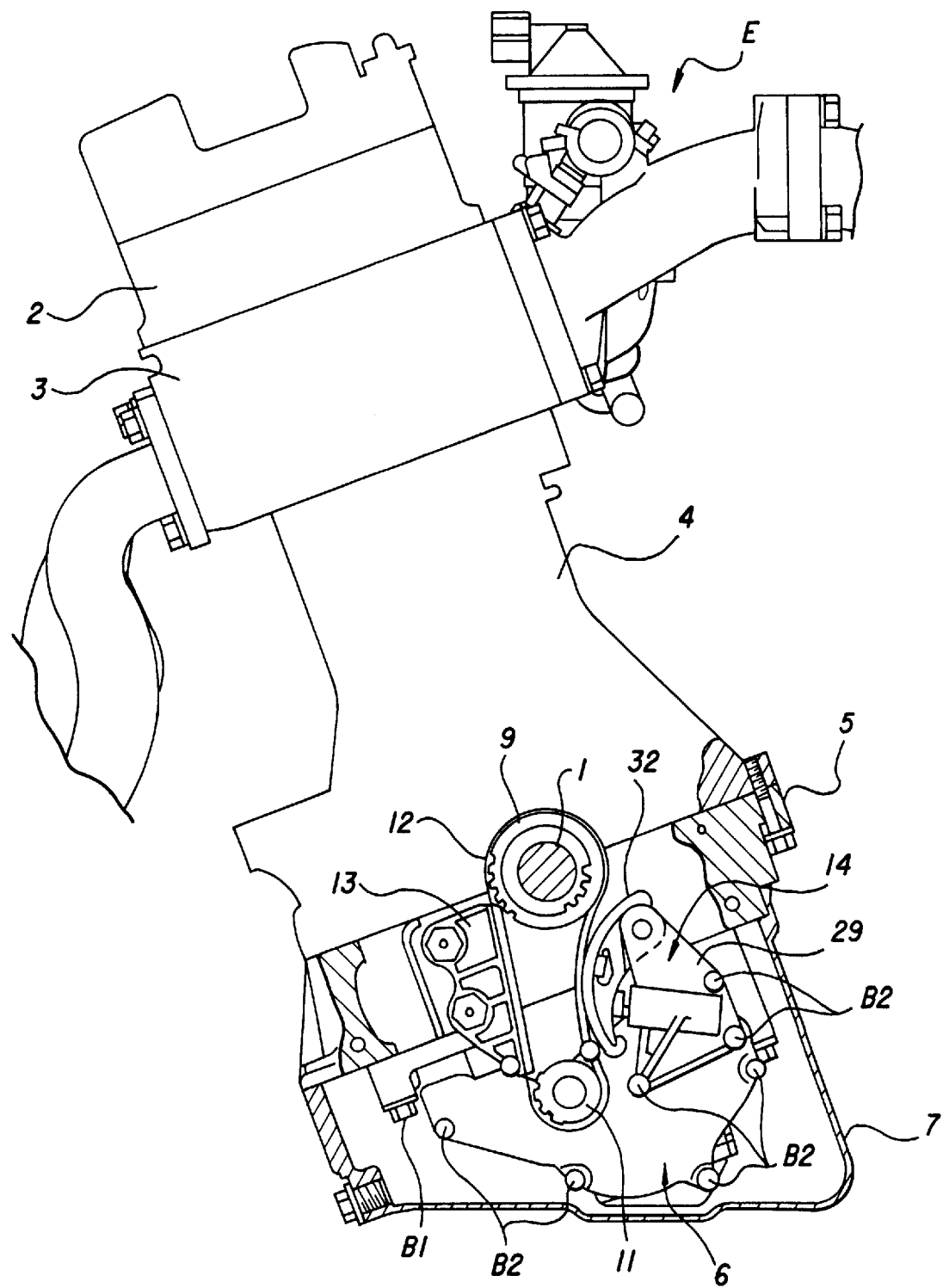
FIG. 1 is a partially cutaway front view of an engine to which the present invention is applied.

FIG. 1 shows a vertical sectional view of a main portion of an engine to which the present invention is applied. This engine E is an in-line four-cylinder engine in which a crankshaft 1 extends horizontally, and as similar to a known engine disclosed in the Japanese Patent Unexamined Publication (Kokai) No. Hei.9-210135, it comprises a cylinder head cover 2, a cylinder head 3, a cylinder block, a lower block 5, a balancing device 6 and an oil pan 7.

Figure 2:
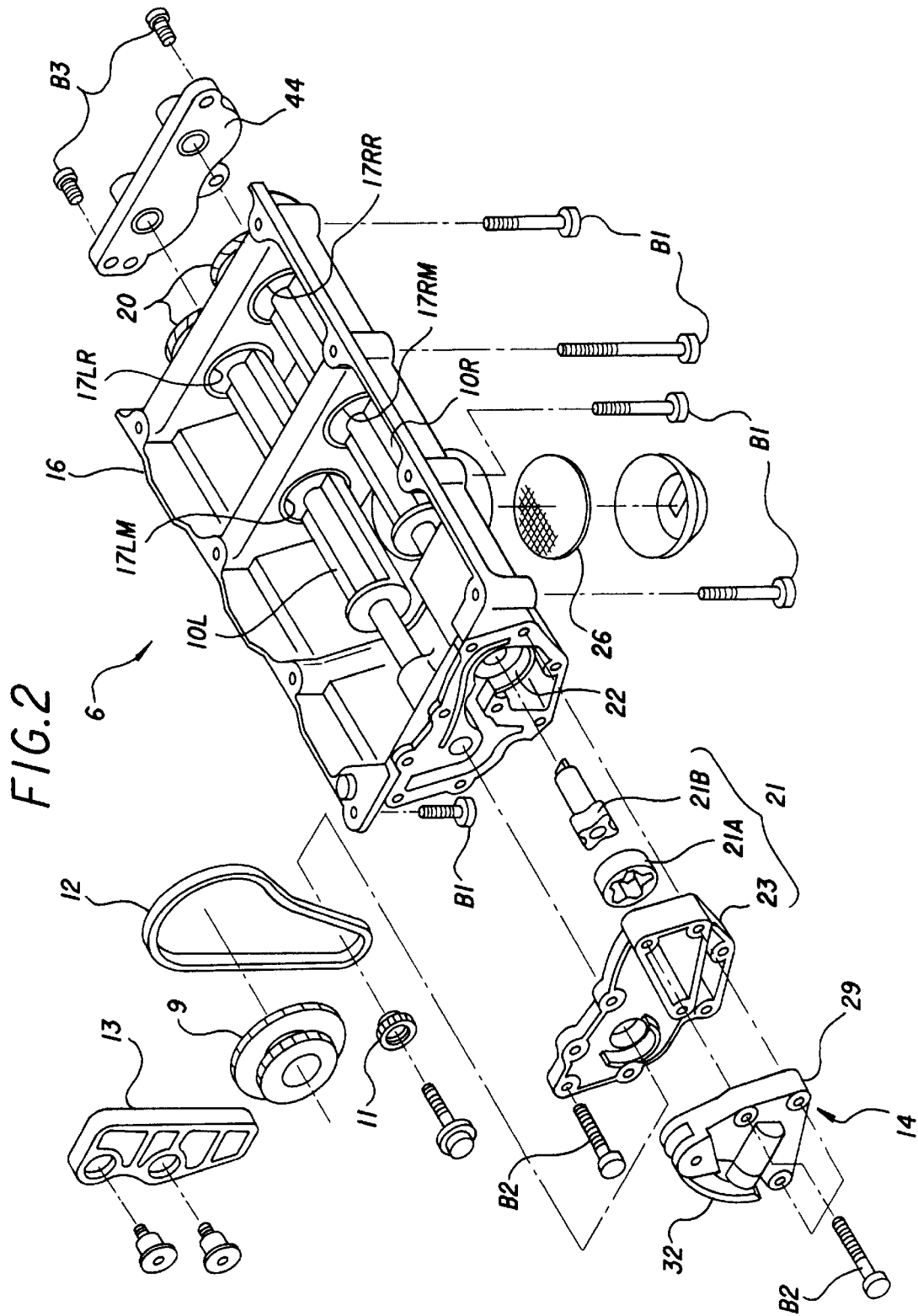
FIG. 2 is an exploded perspective view of a balancing device as viewed from above on the front right-hand side.

The balancing device 6 is provided for reducing secondary vibrations generated by reciprocating movements of pistons and is fixed to a lower surface of the lower block 5 (below a crankshaft) with bolts B1 in a state in which the same device is contained in the oil pan 7. As shown in FIG. 2 as well, the rotation of the crankshaft 1 is designed to be transmitted to the balancing device 6 via a big sprocket 9 fixed to a front end portion of the crankshaft 1 (hereinafter, a crankshaft damper side is regarded as the front), a small sprocket 11 fixed to a front end of a left-hand balance shaft 10L (hereinafter, when directions are referred to with respect to the left and right directions, they are so meant as facing the crankshaft damper), and an endless link chain 12 extended between the two sprockets 9, 11.

The vibration of the link chain 12 is prevented by a chain guide 13 fixed to a front end surface of the lower block 5 at a position leftward of the center of the crankshaft, and a suitable magnitude of tension is all the time imparted to the link chain 12 by a chain tensioner 14 fixed to a front end surface of the balancing device 6 at a position adjacent to the small sprocket.

The balancing device 6 comprises a pair of left and right balance shafts 10L, 10R substantially identical in configuration to each other and a balance shaft holder 16 for supporting those two balance shafts 10L, 10R in parallel with each other and receiving them therein.

Figure 3:
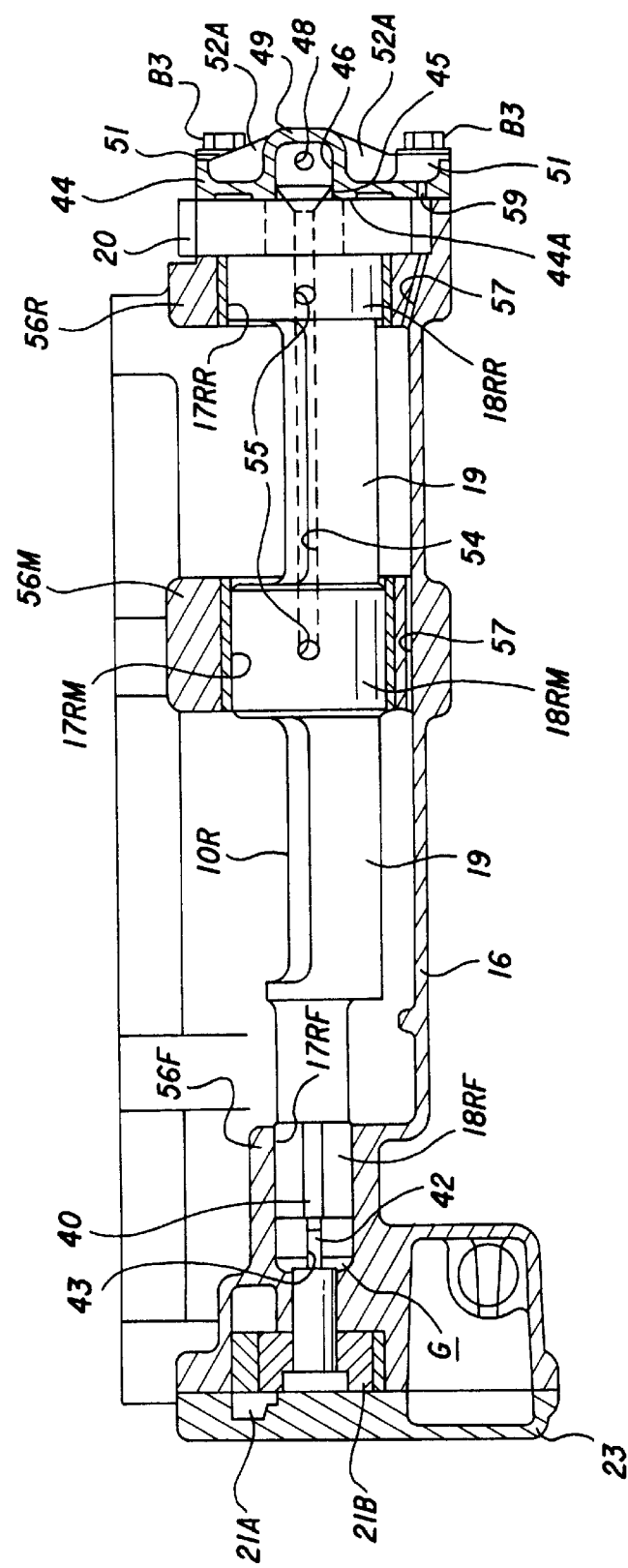
FIG. 3 is a longitudinal sectional view taken along the center of a right balance shaft of the balancing device as viewed from the right-hand side.

The two balance shafts 10L, 10R are put through bearing bores 17 formed in front and rear end and intermediate walls of the balance shaft holder 16 which is formed into a substantially semi-cylindrical shape with an upper surface thereof being opened via journals 18 formed at front and rear end and intermediate portions thereof for support thereon (refer to FIG. 3). Counterweights 19 are formed before and after the intermediate journals 18RM, 18LM of the two balance shafts 10L, 10R for balancing with the inertia of the pistons. In addition, helical gears 20, which are in mesh engagement with each other, are fixed to the respective rear ends (opposite side to the crankshaft damper) of the two balance shafts 10L, 10R.

In an arrangement as described above, the left balance shaft 10L is driven to rotate at twice the crankshaft 1 speed in the same rotational direction as that of the crankshaft 1 by the big sprocket 9, small sprocket 11 and endless link chain 12, and the right balance shaft 10R is then driven to rotate in a direction reverse to the rotational direction of the left balance shaft 10L through the mesh engagement of the helical gears 20.

A trochoidal type lubricating oil pump 21, for instance, is provided on a front wall of the balance shaft holder 16 for supplying under pressure lubricating oil to respective portions of the engine. This lubricating oil pump 21 comprises an outer rotor 21A adapted to be received in a pump receiving portion 22 formed in the front wall of the balance shaft holder 16, an inner rotor 21B adapted to be connected to a front end of the right balance shaft 10R and a pump cover 23 adapted to be joined to a front end surface of the balance shaft holder 16.

Figure 4:
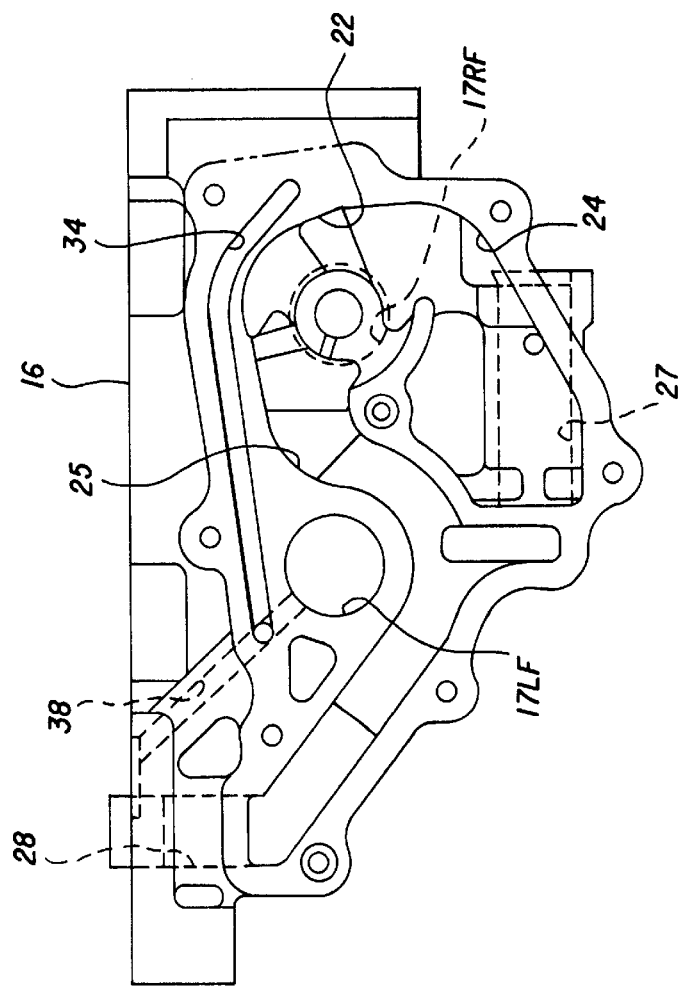
FIG. 4 is a front view of a balance shaft holder.

As shown in FIG. 4 as well, a suction chamber 24 and a discharge chamber 25 are defined in a gap between the front surface of the balance shaft holder 16 and a rear surface of the pump cover 23. In cooperation of the inner rotor 21B adapted to rotate together with the right balance shaft 10R with the outer rotor 21A, lubricating oil sucked into the oil pan 7 from an oil strainer 26 mounted on a bottom wall of the balance shaft holder 16 via a suction lubricating oil passage 27 formed in the bottom wall of the same shaft holder 16 is supplied under pressure to the respective portions of the engine via lubricating oil passages (not shown) formed in the lower block 5 and the cylinder block 4 for connection with a discharge lubricating oil passage 28.

The chain tensioner 14 is fixed with a part of bolts B2 commonlyused for the pump cover 23 fixed to the front end surface of the balance shaft holder 16 to the front surface of the pump cover 23 at a position adjacent rightwards to the small sprocket 11 fixed to the left balance shaft 10L or at a position opposed to a front end of the right balance shaft 10R. Thus, the man-hour required for assembly is intended to be reduced by clamping the pump cover 23 and the chain tensioner 14 together with the same bolts for fixture. In addition, with the chain tensioner 14 being disposed at a position opposed to the front end of the right balance shaft 10R, the chain tensioner 14 is prevented from projecting largely from a triangular contour formed by lines connecting centers of the crankshaft 1 and the two balance shafts 10L, 10R, thus this arrangement being advantageous in that the increase in width of the engine is restrained.

Figure 5:
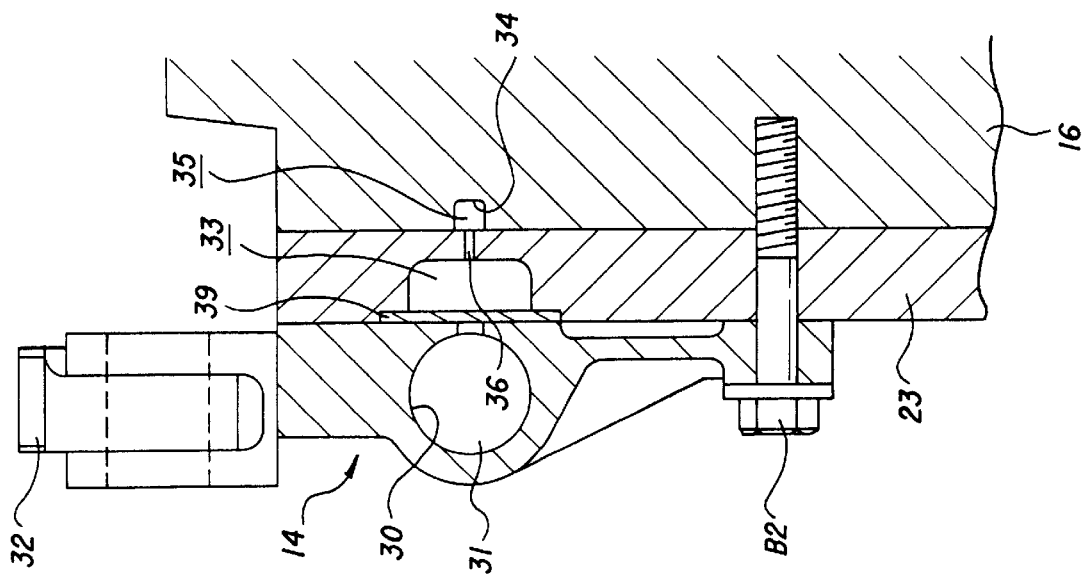
FIG. 5 is a sectional view of a chain tensioner attached to the balance shaft holder taken along the plane normal to an axis of a cylinder bore and as viewed from the right-hand side.
Figure 6:
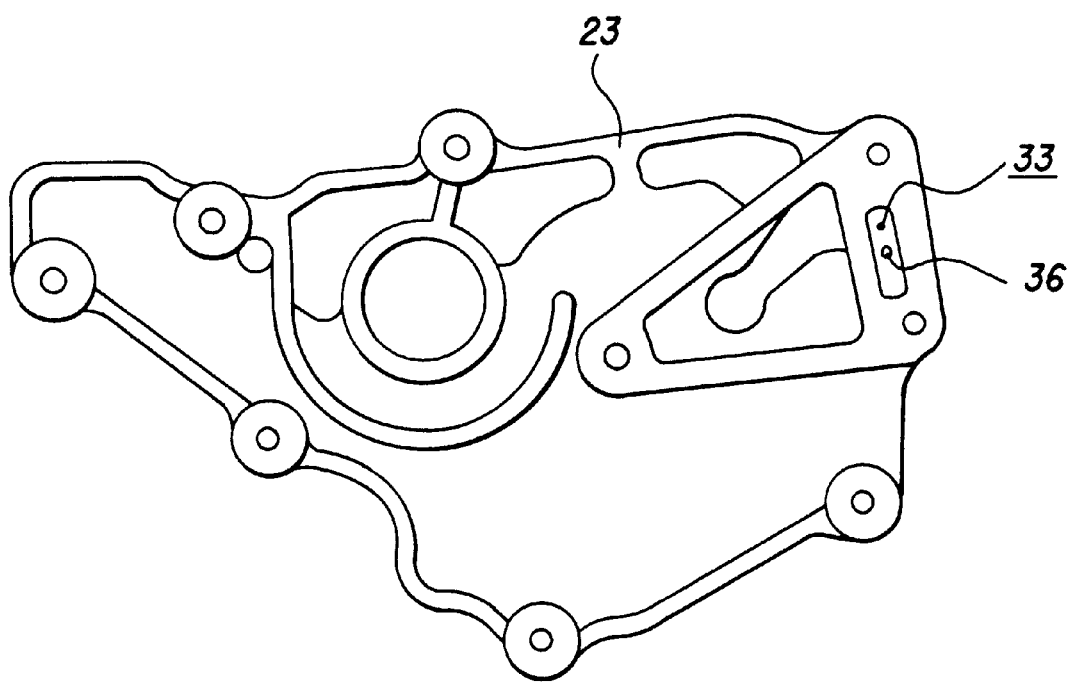
FIG. 6 is a front view of a pump cover.

As shown in FIG. 5, this chain tensioner 14 is constructed such that a plunger 31 slidably fitted in a cylinder bore 30 formed in a tensioner body 29 is pushed out by virtue of the discharge pressure of the lubricating oil pump 21 so as to press against the link chain 12 an arched shoe 32 supported on the tensioner body 29 in such a manner as to freely oscillate at one end thereof. The discharge pressure of the lubricating pump 21 is designed to be supplied to the cylinder bore 30 via a reserve chamber 33 (refer to FIG. 6) recessed in the front surface of the pump cover 23.

The reserve chamber 33 is caused to communicate with a lubricating oil passage 35 defined by a groove 34 recessed in the front surface of the balance shaft holder 16 and the rear surface of the pump cover 23 via an lubricating oil orifice. In addition, the lubricating oil passage 35 in the front surface of the balance shaft holder 16 is caused to branch from the discharge lubricating oil passage 28 for the lower block 5 so as to communicate with a lubricating oil passage 38 formed in the front surface of the balance shaft holder 16 for the front bearing bore 17LF for the left balance shaft 10L (refer to FIG. 4).

An oil filter is interposed between the pump cover 23 and the tensioner body 29.

In the construction as described above in which the reserve chamber 33 and lubricating oil passage 35 for supplying lubricating oil to the cylinder bore 30 are formed in joints between the front surface of the balance shaft holder 16, the pump cover 23 and the tensioner body 29 by joining the tensioner body 20 to the front surface of the pump cover 23, a shortest lubricating oil passage can be formed very simply, thereby enabling a direct supply of lubricating oil from the lubricating oil pump 21 to the cylinder bore 30. Furthermore, since the reserve chamber 33 communicates with the lubricating oil passage 35 via the orifice 36, even if the discharge pressure of the lubricating pump 21 is lowered, there is no risk of the pressing force of the shoe 32 being lowered drastically.

The discharge pressure of the lubricating oil pump 21 is also applied to the front end surface of the right balance shaft 10R to which the inner rotor 21b is directly connected, and this leads to an increase in thrust load on the right balance shaft 10R, which is attributed to the increase in rotational resistance thereof. In this embodiment, to cope with this, the outer circumferential surface of the front journal 18RF of the right balance shaft 10R is partially cut so as to form a flat plane 40, so that a pressure relief passage 41 having an arched cross section as viewed in a direction normal to an axis of the shaft is formed between an inner circumferential surface of the bearing bore 17RF and the front journal 18RF (refer to FIGS. 3 and 7). With this construction, lubricating oil discharged from the lubricating oil pump 21 so as to penetrate into a gap G formed between the front end surface of the right balance shaft 10R and the right bearing bore 17RF in the front end wall of the balance shaft holder 16 is allowed to escape from the passage 41, thereby making it possible to eliminate a risk of the thrust load on the right balance shaft 10R becoming excessive.

Figure 7:
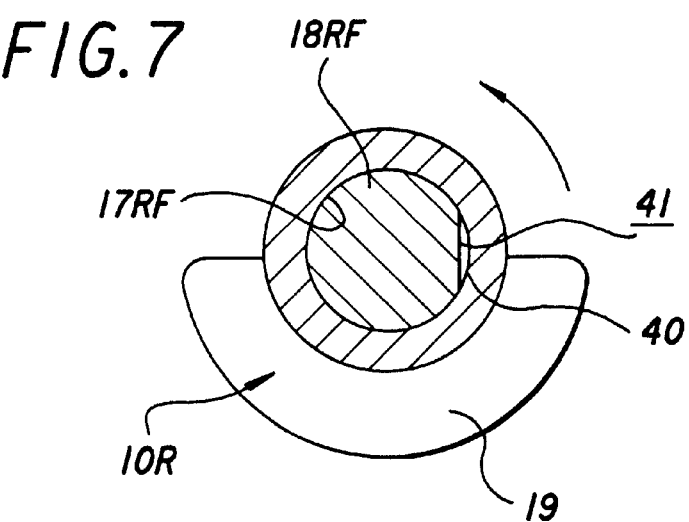
FIG. 7 is a front sectional view of a main portion of a part where a front journal is connected with a bearing bore of the right balance shaft taken along the plane normal to an axis of the balance shaft.

In short, this lubricating oil passage 41 only has to establish a communication between the shaft end surface and the interior of the balance shaft holder 16 from a functional point of view, and therefore, since it can be formed through a very simple process, it is especially preferable to have a passage formed, as described above, by flattening a part of the outer circumference of the journal. In addition, as to where to form such a passage, it is preferable to form one, as shown in FIG. 7, at a boundary portion in transition from a non-weight-provided side to a weight-provided side with respect to the rotational direction of the balance shaft from advantageous facts that a sufficient amount of lubricating oil can be supplied to a side where film lubrication is liable to be lost due to a centrifugal load applied to the counterweight 19 and that an excessive amount of lubricating oil is not relieved when compared with a case where such a passage is formed in the non-weight-provided side.

In addition, in this embodiment, the lubricating oil passage 41 as a pressure relief passage is disposed at a position except for the center of gravity of the counterweight (that is, a position except for a portion where a maximum centrifugal load applied to the counterweight 19 is occurred), so that an excessive amount of bearing load of the passage forming portion is not given.

Figure 12:
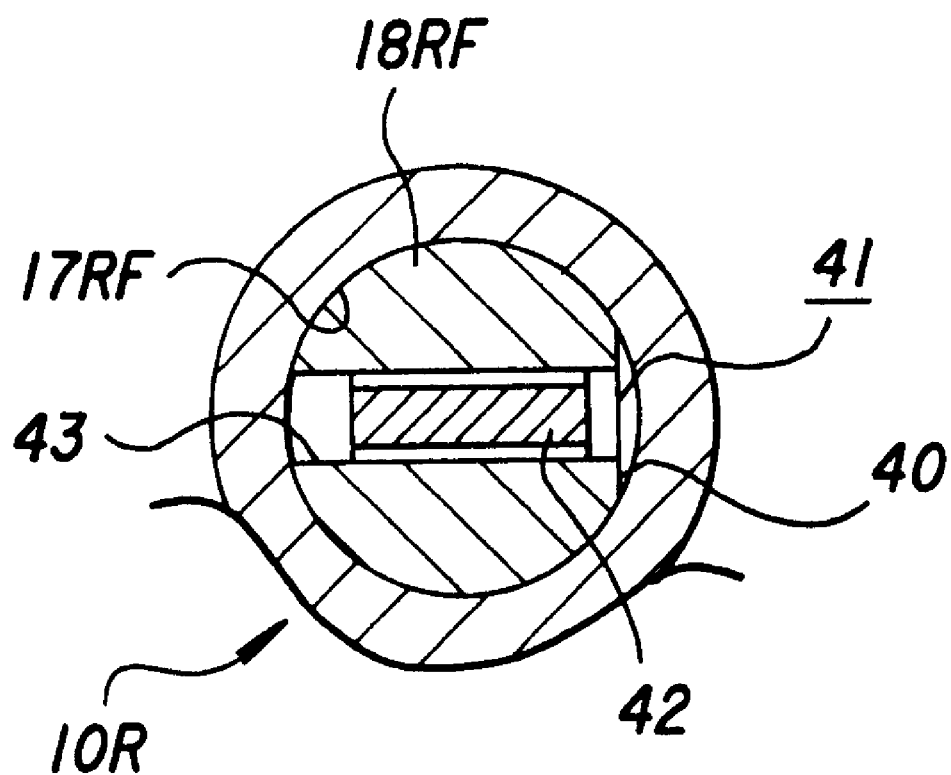
FIG. 12 is a sectional view mainly showing a connection between the inner rotor of the lubricating oil pump and the right balance shaft.

Further, as shown in FIGS. 3 and 12, in this embodiment, the inner rotor 21b of the lubricating oil pump 21 is connected to the right balance shaft 10R by allowing a flat plate portion 42 formed at an axially rear end of the inner rotor 21b to protrude into a slit 43 formed in the front end of the right balance shaft 10R, and thus, if the lubricating oil passage is formed by a surface cutting which is effected in a direction normal to the center line of the slit portion 43, the static balance of the front journal 18RF of the right balance shaft 10R does not have to be deteriorated.

Figure 8:
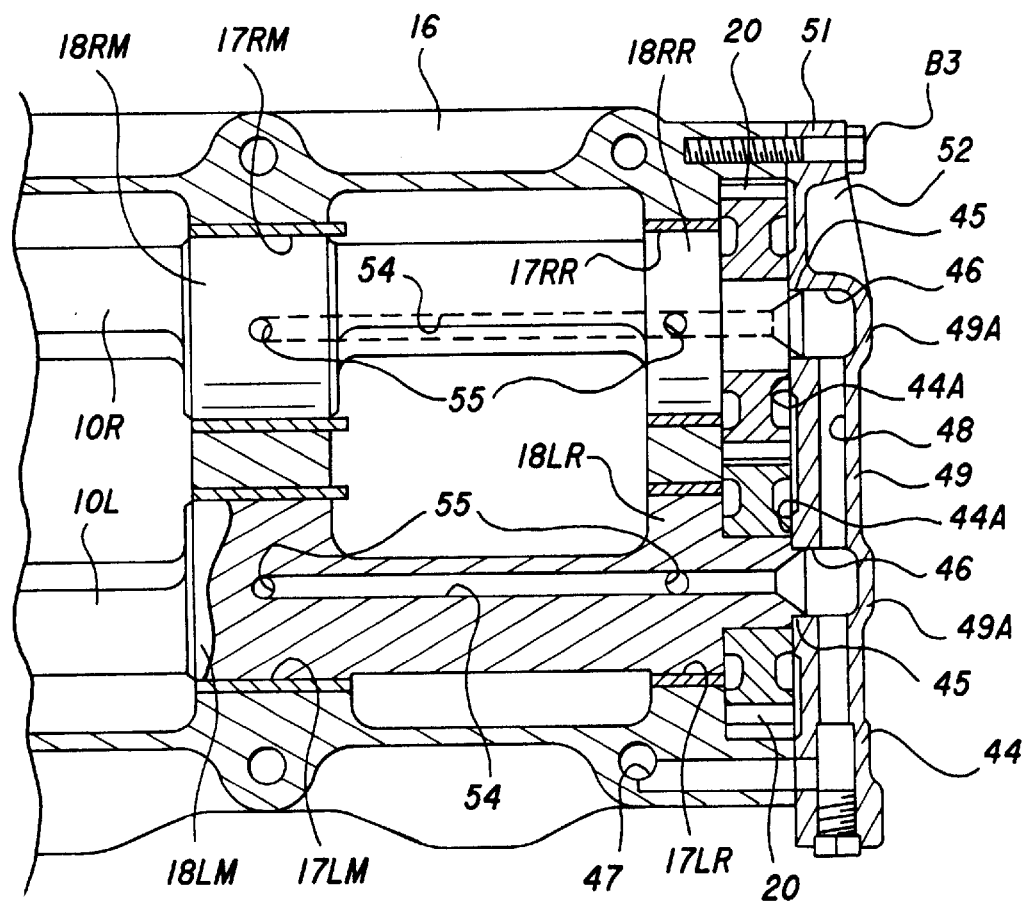
FIG. 8 is a bottom sectional view of a main portion of the balancing dvice taken on the plane along the center of the balance shafts thereof.

A thrust plate 44 is joined to the rear end of the balance shaft holder 16 for preventing the extraction of the two balance shafts 10L, 10R. As shown FIGS. 3 and 8, there are formed in an inner surface of this thrust plate 44 recesses 46 for receiving reduced diameter portions 45 protruding from rear end surfaces of the helical gears 20 fixed to the rear end of the two balance shafts 10L, 10R. When the reduced diameter portions 45 are allowed to protrude in these recesses 46, the rear end surfaces of the helical gears 20 are partially brought into sliding contact with the inner surface of the thrust plate 44, whereby thrust force acting on the balance shafts 10L, 10R can be borne.

Interiors of the two recesses 46 are caused to communicate with each other via a connecting lubricating oil passage 48 continuous with the insertion hole 47 of the bolts B1 for use in fixing the rear left-hand side portion of the balance shaft holder 16 to the lower block 5 . In order to form these two recesses 46 and the connecting lubricating oil passage 48, a swelled portion 49 is formed on an outer surface of the thrust plate 44 in such a manner as to extend transversely from the left side end thereof to the center of the right balance shaft 10R. Ribs 52A are provided to connect bosses 51 in which insertion holes for bolts B3 for use in connecting the thrust plate 44 to the rear end surface of the balance shaft holder 16 to the swelled portion 49, whereby the rigidity of the thrust plate 44 is further increased. In particular, since the ribs 52A connect the bosses 51 to opposed portions 49A to the ends of the respective balance shafts in the swelled portion 49, the improvement in rigidity at surfaces to which the rear end surfaces of the helical gears 20 are partially brought into sliding contact or at thrust force bearing surfaces 44A can be attained with an increase in weight being restrained. Furthermore, connecting a central portion of a rib 52B connecting the two upper bosses 51 to the respective opposed portions 49A with ribs 52C can contribute to a further improvement of the rigidity of the thrust force bearing surfaces 44A.

Figure 9:
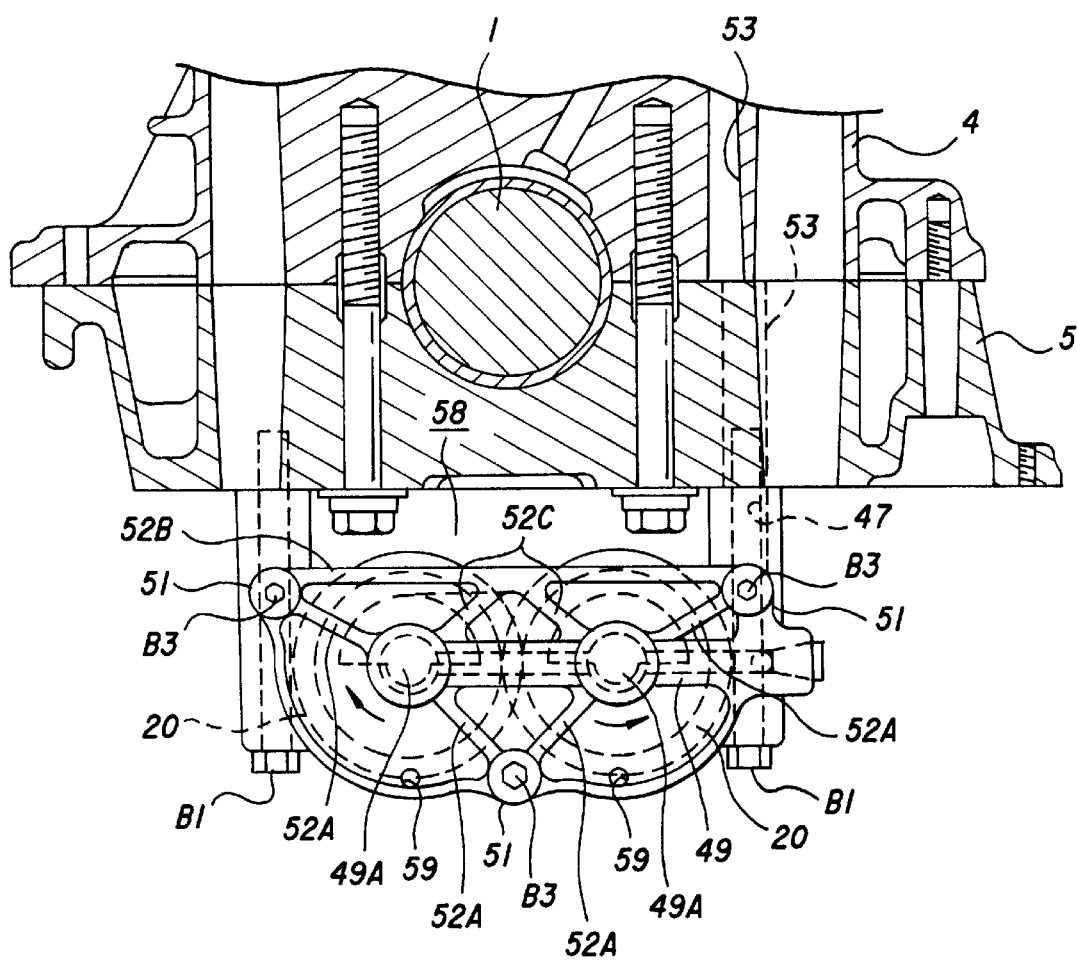
FIG. 9 is a rear view of the balancing device attached to the engine, a cylinder block and a lower block of the engine being shown in section.

The connecting lubricating oil passage 48 is connected to a lubricating oil passage 53 formed in the cylinder block 4 through the lower block 5 so as to guide lubricating oil sent through the cylinder block 4 from the left-hand recess 46 to the right-hand recess 46 (refer to FIG. 9).

An axial lubricating oil passage 54 is formed in central portions of the two balance shafts 10L, 10R in such a manner as to extend from the rear ends to the intermediate journals 18LM, 18RM. In addition, diametrical lubricating oil passages 55 are formed in the intermediate journals 18LM, 18RM and the rear journals 18LR, 18RR in such a manner as to penetrate through the respective journals 18 along respective diametrical lines intersecting with the respective axial lubricating oil passages 54.

With this construction, the respective bearing bores 17 and journals 18 are lubricated therebetween with lubricating oil flowing into the two recesses 46 when it flows out of the diametrical lubricating oil passages 55 via openings formed in the rear ends of the two balance shafts 10L, 10R and the axial lubricating oil passages 54. In synchronism with this, lubricating oil flows via the gap between the outer circumferential surfaces of the reduced diameter portions 45 and the inner circumferential surfaces of the recesses 46 out into a slidably contacting surface between the rear end surfaces of the helical gears 20 and the inner surface of the thrust plate 44 or the thrust force bearing surfaces 44A for lubrication thereof. An amount of lubricating oil flowing out into the thrust force bearing surfaces 44A can be regulated by setting suitably the dimension of the gap between the outer circumferential surfaces of the reduced diameter portions 45 and the inner circumferential surfaces of the recesses 46 so as to obtain an orifice effect.

On the other hand, as shown in FIG. 3, communication holes 57 are formed at root portions of the intermediate wall 56M formed so as to partition the interior of the balance shaft holder 16 into longitudinal front and rear sections and the rear end wall 56R in such a manner that lubricating oil that has dropped in the balance shaft holder 16 can flow into receiving portions in the helical gears 20. In addition, the twisting direction of the helical gears 20 is determined such that a screw pump effect is obtained in which lubricating oil is discharged from an opening 58 formed at an upper portion between the thrust plate 44 and the balance shaft holder 16 to the outside thereof as the both balance shafts 10L, 10R rotate. With this construction, since lubricating oil that has completed the lubrication of the rotating support of the balance shafts 10L, 10R is not retained in the balance shaft holder 16, the agitation of lubricating oil by the balance shafts 10L, 10R eliminates drawbacks that aeration is caused and that rotational resistance is caused by the viscosity of lubricating oil. In addition, a lubricating oil discharge hole 59 may be provided in a lower portion of the thrust plate 44 so as to discharge lubricating oil remaining in a lower portion of the balance shaft holder 16.

Figure 10:
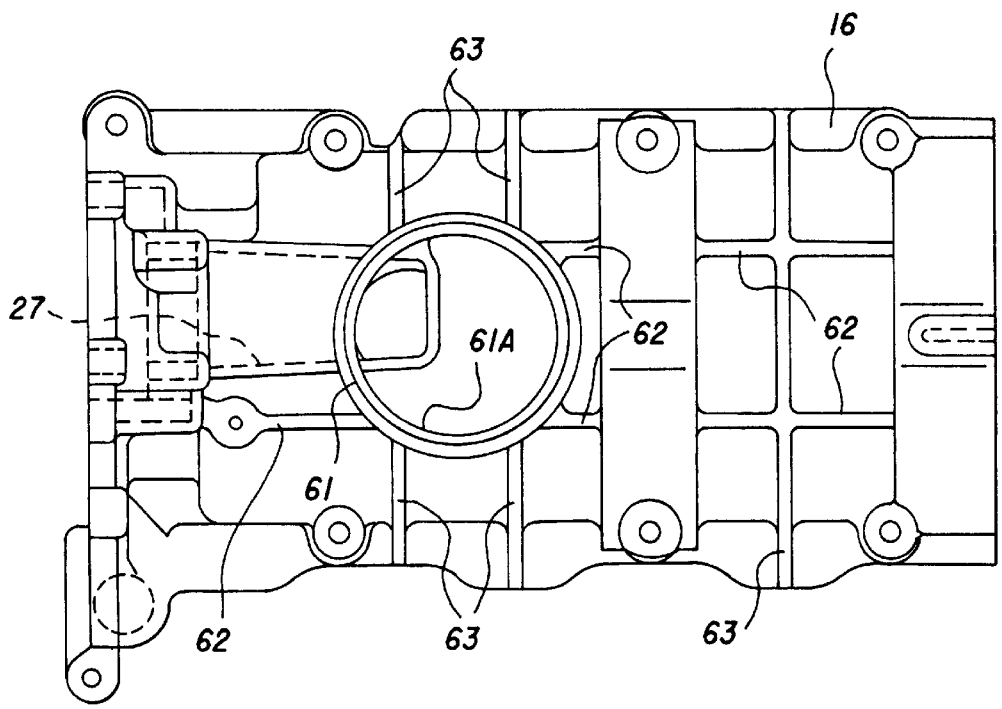
FIG. 10 is a bottom view of the balance shaft holder.
Figure 11:
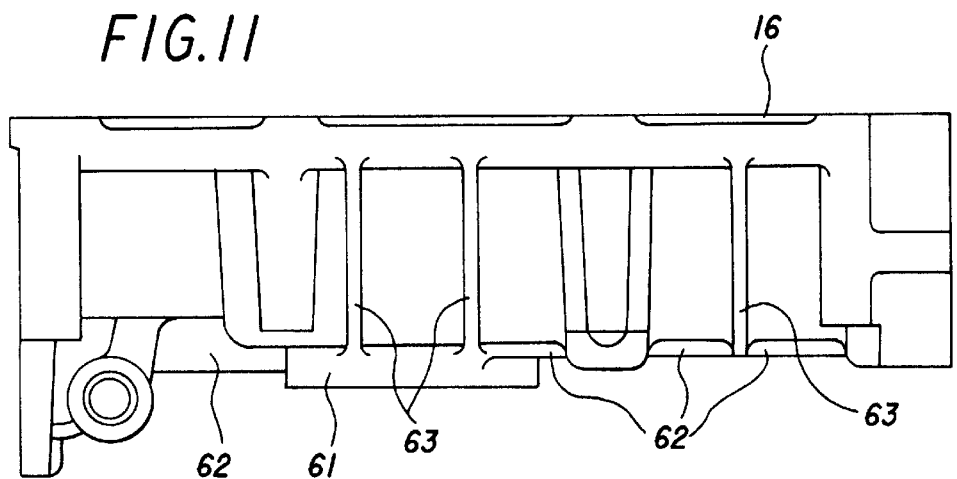
FIG. 11 is a side view of the balance shaft holder as viewed from the right-hand side.

As shown in FIGS. 10 and 11, an annular projecting portion 61 having formed therein a mounting bore 61A for mounting an oil strainer therein is formed in a portion at a central area of the bottom wall of the balance shaft holder 16 portion which is closer to the intermediate wall 56M. Since the annular projecting portion 61 is formed as described above, the rigidity of the oil strainer supporting portion is increased further. In addition, formed integrally on the outer circumferential surface of the balance shaft holder 16 are logitudinal ribs 62 extending along the axes of the balance shafts 10L, 10R and transverse ribs 63 extending in a direction normal to the longitudinal ribs 62. These ribs 62, 63 are connected to the periphery of the annular projecting portion 61 as the oil strainer mounting portion, whereby the balance shaft holder 16 is reinforced. These ribs 62, 63 protrude from the outer surface of the balance shaft holder 16 and impart a certain resistance to the flow of lubricating oil stored in the oil pan 7, thereby functioning to make it difficult to generate a phenomenon in which oscillating lubricating oil strikes at the inner surface of the oil pan 7. When the balance shaft holder 16 made highly rigid as described above is connected to the lower block 5, a plurality of bearing caps provided on the lower block 5 so as to be adjacent to each other in the axial direction of the crankshaft 1 are connected to each other, and therefore the supporting rigidity of the crankshaft 1 is also increased.

In the above embodiment, only the description of the secondary balance shafts has been made, but the present invention is not limited to such an application but may be applied to a balance shaft for reducing vibrations of other orders such as a primary balance shaft.

Consequently, in accordance with the present invention, since the chain tensioner can be disposed within a range that does not project largely from the triangular contour formed by the two balance shafts and the crankshaft, the overall external dimensions of the engine can be restrained from being increased, and therefore the present invention is markedly advantageous in promoting the compactification of the engine.

The present invention is based on Japanese Patent Application No. Hei. 10-228380 which is incorporated herein by reference. While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A balancing device for a reciprocating engine comprising:
    a first and second balance shafts intermeshed with each other;
    a chain and sprocket mechanism for coupling at least one of said first and second balance shafts with a crankshaft;
    a chain tensioner for automatically adjusting the tension of a chain of said chain and sprocket mechanism;
    a lubricating oil pump having a rotor; and
    a balance shaft holder for supporting said first and second balance shafts, said balance shaft holder integrally provided with a pump receiving portion for receiving said rotor,
    wherein said rotor of said lubricating oil pump is directly connected to said second balance shaft, and said chain tensioner is disposed on an shaft end side of said second balance shaft.

2. The balancing device according to claim 1, further comprising:
    a chamber disposed at the shaft end side of said second balance shaft and subjected to a discharge pressure of said lubricating oil pump; and
    a pressure relief passage communicated with said chamber and disposed on a journal of said second balance shaft for relieving said discharge pressure.

3. The balancing device according to claim 2, wherein said pressure relief passage is formed by cutting a part of the outer circumference of said journal.

4. The balancing device according to claim 2, wherein said pressure relief passage is formed by cutting a part of the outer circumference of said journal, said part containing a boundary portion in transition from a non-counter-weight provided side to a counter-weight provided side with respect to a rotational direction of said second balance shaft.

5. The balancing device according to claim 3, wherein said pressure relief passage is disposed at a position where the center of gravity of a counter-weight which is formed on said second balance shaft is not located.

6. The balancing device according to claim 2, wherein said rotor of said lubricating oil pump is provided with a flat plate portion at an axially rear end thereof, and said second balance shaft is provided with a slit portion at the front end thereof, and
    wherein said flat plate portion is protruded into said slit portion so as to connect said rotor and said second balance shaft, and said pressure relief passage is formed by cutting a part of said slit portion in a direction perpendicular to a center line of said slit.

* * * * *